(12) United States Patent
Lakshminarayana et al.

(10) Patent No.: US 11,487,857 B2
(45) Date of Patent: Nov. 1, 2022

(54) SPECTRUM AUTHENTICATION IN EDGE DEVICES

(71) Applicant: Bank of America Corporation, Charlotte, NC (US)

(72) Inventors: Nagasubramanya Lakshminarayana, Hyderabad (IN); Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 277 days.

(21) Appl. No.: 16/580,051

(22) Filed: Sep. 24, 2019

(65) Prior Publication Data

US 2021/0089634 A1  Mar. 25, 2021

(51) Int. Cl.
| | | |
|---|---|---|
| G06F 21/32 | (2013.01) | |
| H04L 9/40 | (2022.01) | |
| H04L 9/32 | (2006.01) | |
| G06Q 20/38 | (2012.01) | |

(52) U.S. Cl.
CPC ......... G06F 21/32 (2013.01); G06Q 20/3821 (2013.01); H04L 9/3236 (2013.01); H04L 63/083 (2013.01); H04L 63/0861 (2013.01); G06F 2221/2139 (2013.01)

(58) Field of Classification Search
CPC .................................................... G06F 21/32
See application file for complete search history.

(56) References Cited

U.S. PATENT DOCUMENTS

| | | | | |
|---|---|---|---|---|
| 5,764,789 A | * | 6/1998 | Pare, Jr. | G06F 21/83 382/115 |
| 5,805,719 A | * | 9/1998 | Pare, Jr. | G06F 21/86 382/115 |
| 8,073,770 B2 | * | 12/2011 | Cole | G06Q 40/04 705/39 |
| 9,882,912 B2 | | 1/2018 | Joo | |
| 10,044,674 B2 | | 8/2018 | Liu et al. | |
| 10,057,264 B1 | | 8/2018 | ElNakib et al. | |
| 10,063,549 B1 | | 8/2018 | Dotan et al. | |
| 10,164,983 B2 | | 12/2018 | Chen et al. | |
| 10,219,152 B2 | | 2/2019 | Muhanna et al. | |
| 2009/0106558 A1 | * | 4/2009 | Delgrosso | G06F 21/41 713/184 |
| 2013/0008958 A1 | * | 1/2013 | Smith | G07C 9/00904 235/382 |

(Continued)

*Primary Examiner* — Simon P Kanaan
(74) *Attorney, Agent, or Firm* — Banner & Witcoff, Ltd.

(57) ABSTRACT

A fog/edge server machine for authenticating a user in an edge computing model is disclosed using a data spectrum table and spectrum hash values to improve performance, efficiency, and/or security. The edge computing model may include, in some examples, a secure Internet of Things (IoT) and/or mobile-based authentication system. Illustrative embodiments of a spectrum table stored at fog/edge server, a spectrum data array and spectrum hash value generated and stored in memory at the fog/edge sever, and a large, data table stored at an application server are disclosed herein to show continuous/subsequent authentication of the user with attributes/values/inputs collected by one or more edge devices during post-login activities/interactions to re-authenticate/maintain the authentication.

20 Claims, 7 Drawing Sheets

(56) References Cited

U.S. PATENT DOCUMENTS

| | | | |
|---|---|---|---|
| 2015/0324564 A1* | 11/2015 | Sahu | H04L 63/0861 |
| | | | 726/19 |
| 2015/0332274 A1* | 11/2015 | Prodam | G06K 9/00087 |
| | | | 705/18 |
| 2017/0091433 A1* | 3/2017 | Anderson | G06K 9/00892 |
| 2017/0264608 A1* | 9/2017 | Moore | H04W 12/06 |
| 2020/0374700 A1* | 11/2020 | Smith | H04L 9/3247 |

* cited by examiner

FIG. 1

| Data @ App Server |||||||||
|---|---|---|---|---|---|---|---|---|
| StudentId | Class | Gender | Age | Height | Appearance | Complexion | Eye_Color | Hair_Color | Hash |
| Std0001 | Class_Ref_2 | Gen_1 | Age_3 | Height_4 | App_Ref_1 | Cmplx_Ref_0 | EyeRef_0 | Hair_Ref_4 | HashXXX |
| Std0002 | Class_Ref_1 | Gen_2 | Age_7 | Height_4 | App_Ref_2 | Cmplx_Ref_1 | EyeRef_0 | Hair_Ref_0 | HashXXX |
| Std0003 | Class_Ref_3 | Gen_2 | Age_4 | Height_5 | App_Ref_2 | Cmplx_Ref_1 | EyeRef_1 | Hair_Ref_1 | HashXXX |
| Std0004 | Class_Ref_1 | Gen_1 | Age_5 | Height_6 | App_Ref_3 | Cmplx_Ref_0 | EyeRef_2 | Hair_Ref_2 | HashXXX |
| Std0005 | Class_Ref_5 | Gen_1 | Age_10 | Height_7 | App_Ref_4 | Cmplx_Ref_1 | EyeRef_3 | Hair_Ref_3 | HashXXX |
| Std0006 | Class_Ref_6 | Gen_2 | Age_7 | Height_8 | App_Ref_5 | Cmplx_Ref_1 | EyeRef_4 | Hair_Ref_4 | HashXXX |
| Std0007 | Class_Ref_7 | Gen_1 | Age_11 | Height_9 | App_Ref_1 | Cmplx_Ref_0 | EyeRef_5 | Hair_Ref_5 | HashXXX |
| Std0008 | Class_Ref_8 | Gen_1 | Age_9 | Height_10 | App_Ref_2 | Cmplx_Ref_1 | EyeRef_6 | Hair_Ref_6 | HashXXX |
| Std0009 | Class_Ref_9 | Gen_2 | Age_3 | Height_11 | App_Ref_2 | Cmplx_Ref_2 | EyeRef_7 | Hair_Ref_7 | HashXXX |
| Std0010 | Class_Ref_10 | Gen_2 | Age_7 | Height_12 | App_Ref_3 | Cmplx_Ref_1 | EyeRef_8 | Hair_Ref_8 | HashXXX |
| Std0011 | Class_Ref_11 | Gen_1 | Age_4 | Height_13 | App_Ref_4 | Cmplx_Ref_0 | EyeRef_9 | Hair_Ref_9 | HashXXX |
| Std0012 | Class_Ref_12 | Gen_1 | Age_5 | Height_14 | App_Ref_5 | Cmplx_Ref_1 | EyeRef_10 | Hair_Ref_10 | HashXXX |
| Std0013 | Class_Ref_13 | Gen_2 | Age_10 | Height_15 | App_Ref_1 | Cmplx_Ref_2 | EyeRef_11 | Hair_Ref_11 | HashXXX |
| Std0014 | Class_Ref_14 | Gen_1 | Age_7 | Height_16 | App_Ref_2 | Cmplx_Ref_1 | EyeRef_12 | Hair_Ref_12 | HashXXX |
| Std0015 | Class_Ref_15 | Gen_1 | Age_11 | Height_17 | App_Ref_3 | Cmplx_Ref_0 | EyeRef_13 | Hair_Ref_13 | HashXXX |
| Std0016 | Class_Ref_16 | Gen_2 | Age_9 | Height_18 | App_Ref_3 | Cmplx_Ref_1 | EyeRef_14 | Hair_Ref_14 | HashXXX |
| Std0017 | Class_Ref_17 | Gen_1 | Age_18 | Height_19 | App_Ref_4 | Cmplx_Ref_2 | EyeRef_15 | Hair_Ref_15 | HashXXX |
| Std0018 | Class_Ref_18 | Gen_1 | Age_5 | Height_20 | App_Ref_5 | Cmplx_Ref_2 | EyeRef_16 | Hair_Ref_16 | HashXXX |
| Std0019 | Class_Ref_19 | Gen_2 | Age_10 | Height_21 | App_Ref_1 | Cmplx_Ref_1 | EyeRef_17 | Hair_Ref_17 | HashXXX |
| Std0020 | Class_Ref_20 | Gen_2 | Age_7 | Height_22 | App_Ref_2 | Cmplx_Ref_1 | EyeRef_18 | Hair_Ref_18 | HashXXX |

| | | Spectrum @ Fog Server | | | | | | | | | |
|---|---|---|---|---|---|---|---|---|---|---|---|
| | | 4 | 5 | 6 | 7 | 8 | 9 | 10 | 11 | 12 | 13 |
| 1 | Age | Age_0 | Age_1 | Age_2 | Age_3 | Age_4 | Age_5 | Age_6 | Age_7 | Age_8 | Age_9 |
| | Age_Ref | | | | | | | | | | |
| 2 | Gender | Male | Female | | | | | | | | |
| | Gender_Ref | Gen_0 | Gen_1 | | | | | | | | |
| 3 | Height(CM) | 35 | 36 | 37 | 38 | 39 | 40 | 41 | 42 | 43 | 44 |
| | Height_Ref | Height_0 | Height_1 | Height_2 | Height_3 | Height_4 | Height_5 | Height_6 | Height_7 | Height_8 | Height_9 |
| 4 | Appearance | Lean | Normal | Obese | | | | | | | |
| | Appearance_Ref | App_Ref_0 | App_Ref_1 | App_Ref_2 | | | | | | | |
| 5 | Complexion | Fair | Medium | Warm | Tan | Dark | | | | | |
| | Complexion_Ref | Cmplx_Ref_0 | Cmplx_Ref_1 | Cmplx_Ref_2 | Cmplx_Ref_3 | Cmplx_Ref_4 | | | | | |
| 6 | Eye Color | Blue | Brown | Green | Purple | | | | | | |
| | EyeColor_Ref | EyeRef_0 | EyeRef_1 | EyeRef_2 | EyeRef_3 | | | | | | |
| 7 | Hair Color | Brown | Black | Light Brown | Grey | Golden | | | | | |
| | HairColor_Ref | Hair_Ref_0 | Hair_Ref_1 | Hair_Ref_2 | Hair_Ref_3 | Hair_Ref_4 | | | | | |
| 8 | Class | 1 | 2 | 3 | 4 | 5 | 6 | 7 | 8 | 9 | 10 |
| | Class_Ref | Class_Ref_0 | Class_Ref_1 | Class_Ref_2 | Class_Ref_3 | Class_Ref_4 | Class_Ref_5 | Class_Ref_6 | Class_Ref_7 | Class_Ref_8 | Class_Ref_9 |

| User Features | Class-3 | Male | 7 Years | 39 | Lean | Fair | Blue | Golden |
|---|---|---|---|---|---|---|---|---|
| Spectrum | Class_Ref_2 | Gen_0 | Age_3 | Height_4 | App_Ref_0 | Cmplx_Ref_0 | EyeRef_0 | Hair_Ref_4 | #SpectrumHash |

SPECTRUM AUTHENTICATION IN EDGE DEVICES

TECHNICAL FIELD

Aspects of the disclosure provide effective, efficient, and scalable technical solutions that address and overcome the technical problems associated with computing environments, including Internet of Things (IoT), by using one or more features disclosed herein.

BACKGROUND

There is a need for improvements to edge computing solutions that address one or more technical challenges that exist in the industry today. For example, real-time IoT and/or mobile-based authentication systems have challenges that fail to incorporate and/or implement behavioral or cognitive authentication considerations. For example, real-time IoT and/or mobile-based authentication systems sometime require the transfer of a huge amount of streaming data to one or more servers for analysis. This can place a technical burden on the operation of the system. In another example, a real-time IoT and/or mobile-based authentication system can sometimes have technical hurdles to implementing as a server-centric approach. Nevertheless, storing a huge amount of data outside of a server-centric approach can also create technical challenges and a burden on the operation of the system. In addition, storing any sensitive data outside of a secure serve-centric model may create undesirable security and/or privacy risks.

The combination of features disclosed herein address one or more of the aforementioned risks and drawbacks in existing computing solutions to provide a technical solution to a technological problem in the industry.

BRIEF SUMMARY

One general aspect of the disclosure includes one or more non-transitory computer-readable media storing instructions that, when executed by a computer processor, cause a sensor computing system to: receive sensor data from a plurality of sensors of one or more edge devices, where the plurality of sensors are configured to capture attributes of a user; process, by the computer processor, the sensor data to identify a plurality of attributes corresponding to the user; assign a value to each field in a spectrum data array according to the plurality of attributes identified; generate a spectrum hash value for the spectrum data array using a hashing algorithm; when the generated hash value matches with a pre-stored hash value, then grant authentication to the user; and send an indication of granted user authentication in response to the match step. Other embodiments of this aspect include corresponding computer systems, apparatus, and computer programs recorded on one or more computer storage devices, each configured to perform the actions of the methods.

Implementations may include one or more of the following features. The one or more non-transitory computer-readable media where the one or more sensors are arranged in an automated teller machine. The one or more non-transitory computer-readable media where the sensor computing system includes an edge server machine storing a data spectrum table, and where an application server machine maintains the pre-stored hash value. The one or more non-transitory computer-readable media where the match step occurs one of: continuously, and at an automatically recurring period of time during a user interaction with the sensor computing system; where the attributes of the user captured by the one or more edge devices include visual characteristics of the user. Implementations of the described techniques may include hardware, a method or process, or computer software on a computer-accessible medium.

One general aspect includes a sensor computing system, including a processor and a memory storing computer-readable instructions that, when executed by the processor, cause the sensor computing system to perform numerous operations. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

BRIEF DESCRIPTION OF THE DRAWINGS

The present disclosure is illustrated by way of example and not limited in the accompanying figures in which like reference numerals indicate similar elements and in which.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

DETAILED DESCRIPTION

Figure 2:
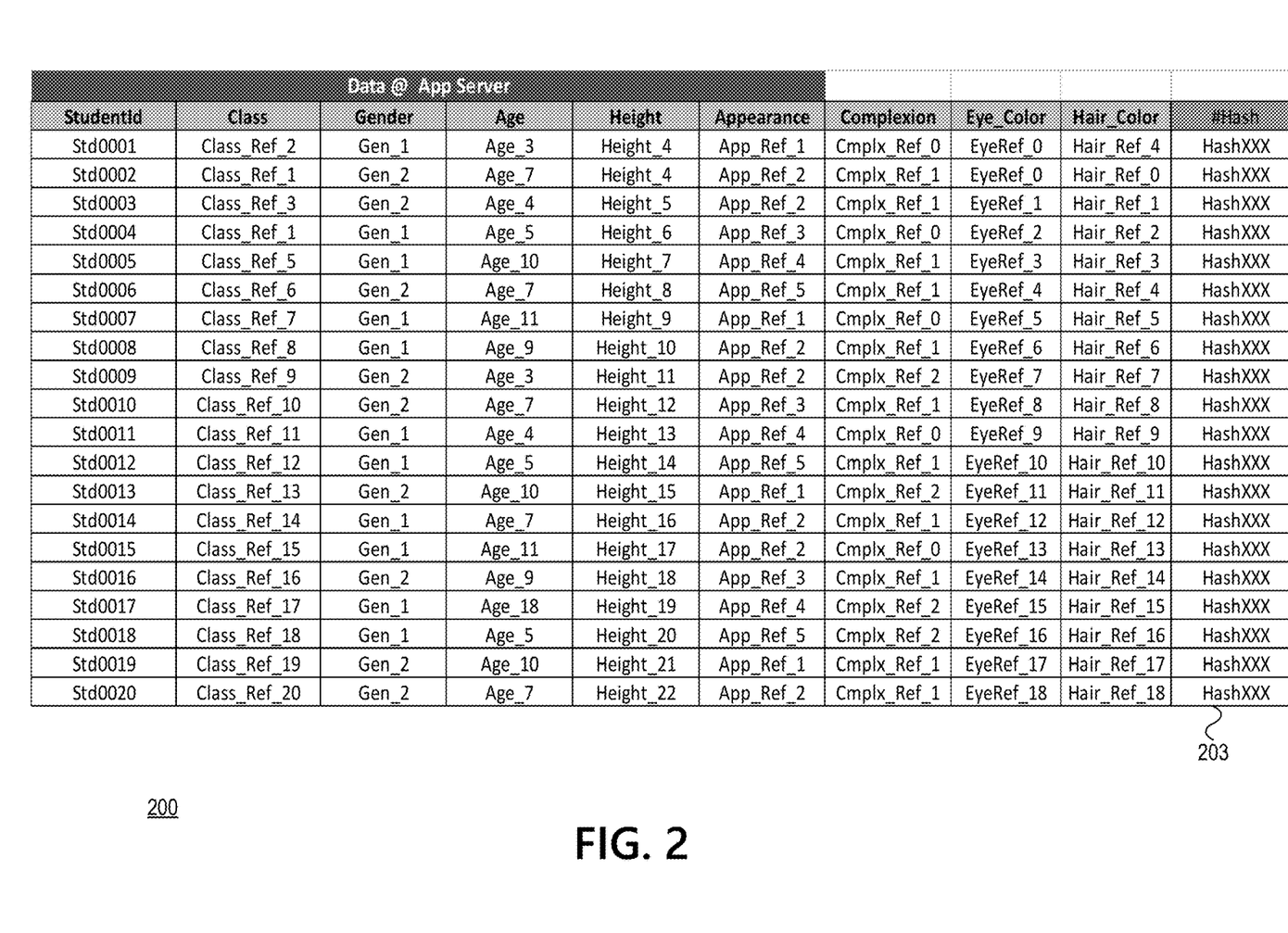
FIG. 2 is a table with illustrative values corresponding to various variables described herein in accordance with one or more example embodiments.
Figure 3A:
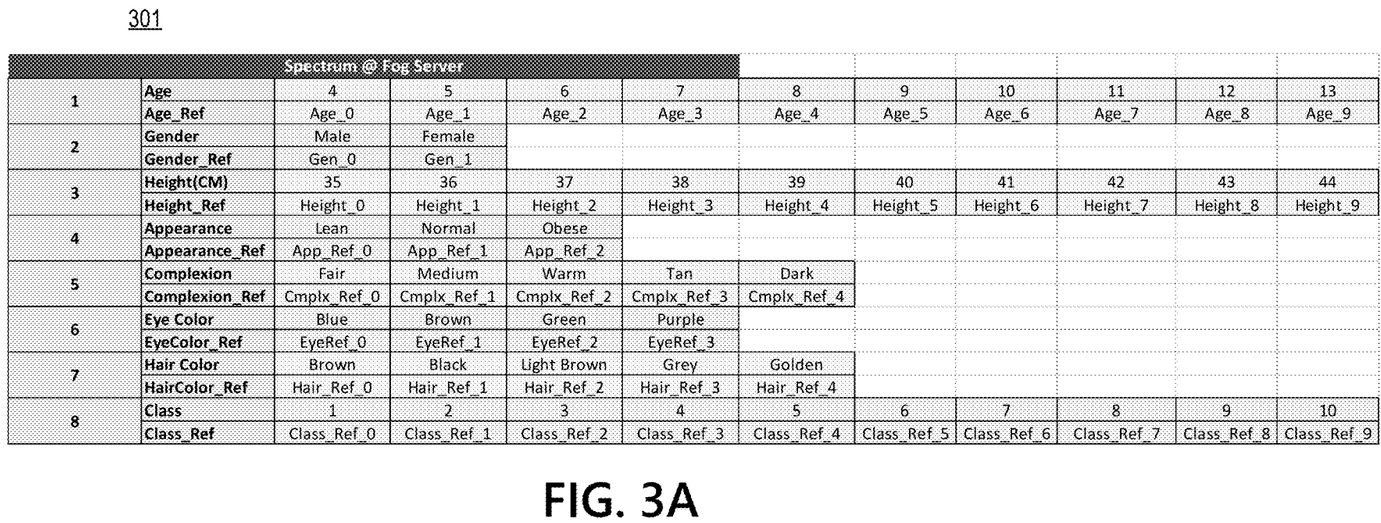
FIG. 3A and FIG. 3B are tables with illustrative values corresponding to various variables described herein in accordance with one or more example embodiments.
Figure 3B:
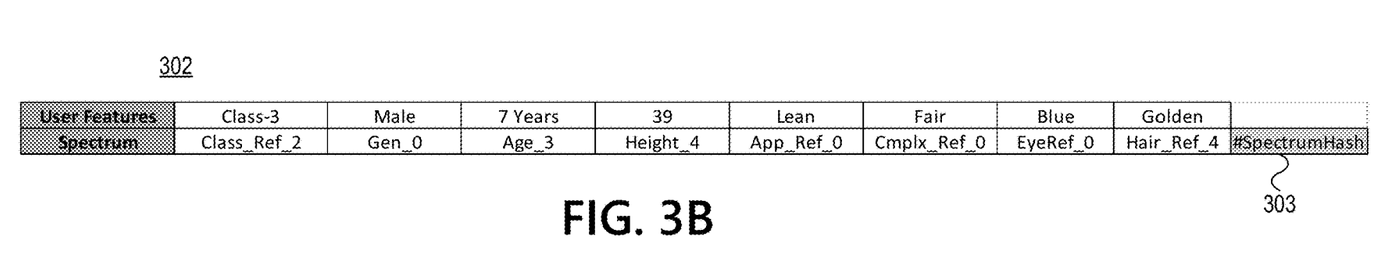

In one example, apparatuses, method steps, and systems are described here for a fog/edge server machine for authenticating a user in an edge computing model using a data spectrum table and spectrum hash values. In some examples, the system results in improved performance, efficiency, and/or security. The edge computing model may include, in some examples, a secure Internet of Things (IoT) and/or mobile-based authentication system. Illustrative embodiments of a spectrum table stored at fog/edge server (as illustrated in FIG. 3A), a spectrum data array and spectrum hash value generated and stored in memory at the fog/edge sever (as illustrated in FIG. 3B), and a large, data table stored at an application server (as illustrated in FIG. 2), are disclosed herein to show continuous/subsequent authentication of the user with attributes/values/inputs collected by one or more edge devices during post-login activities/interactions to re-authenticate/maintain the authentication.

However, the disclosed solutions are not limited to any specific sensor and may be integrated with one or more IoT systems of different types, including systems that receive sensor measurements but are not typically labeled as IoT systems. In some examples, one or more edge devices in the system may capture and process characteristics of or related to the user requesting authentication. For example, real-time information about the user may be collected in the form of visual, audible, biometric, or other forms of sensory input from one or more sensors on the one or more edge devices communicatively coupled to the system. Moreover, the systems described herein may be used for a variety of different functions, yet they may all share a desire to authenticate a user, not just initially, but on an ongoing, continual, repetitive basis. Edge devices as referenced in this disclosure may comprise one or more of a sensor, computer memory, and/or processing elements to perform the operations described herein.

Figure 1:
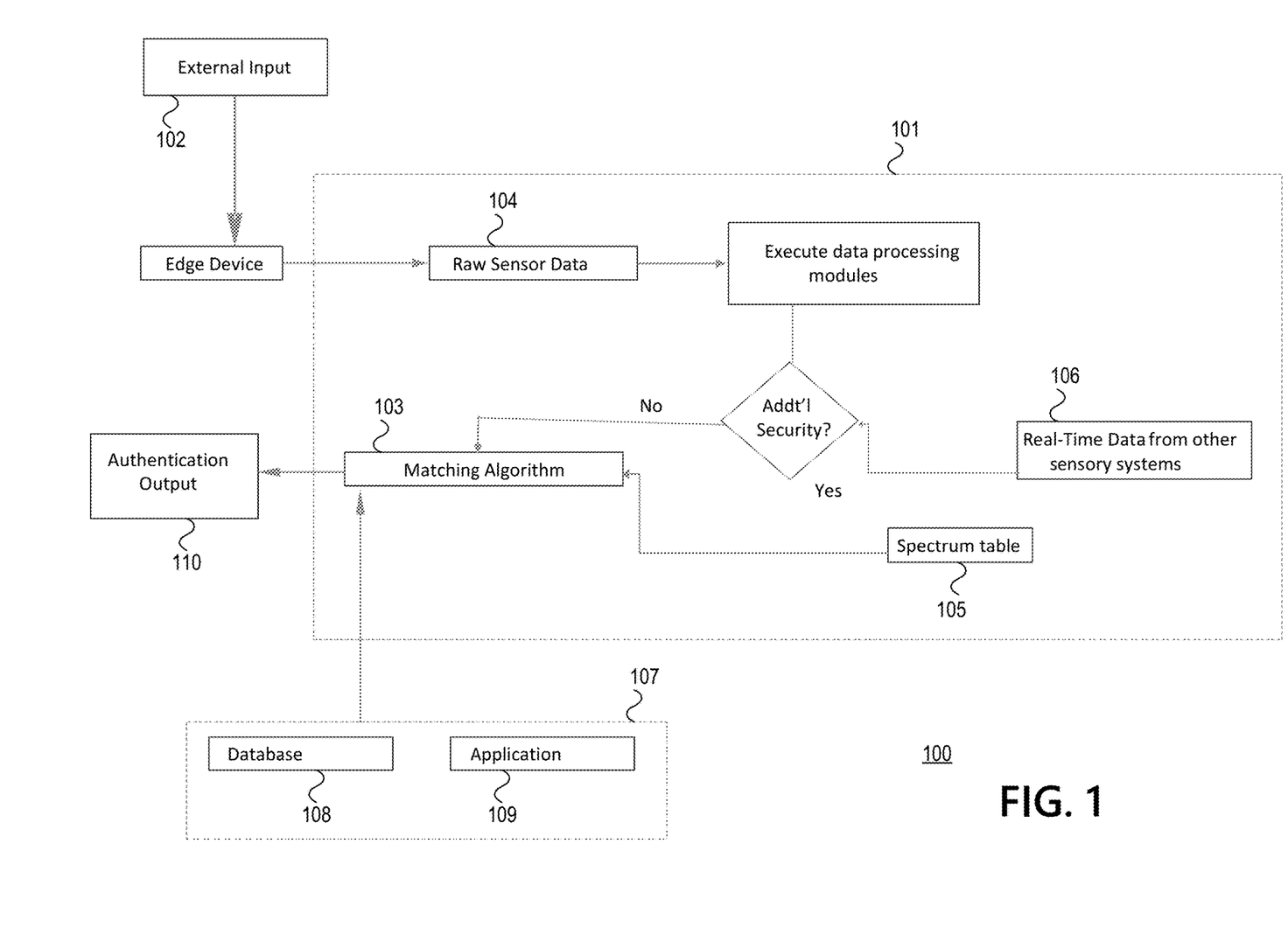
FIG. 1 depict illustrative computing environments in accordance with one or more example embodiments.

For example, FIG. 1 depicts one illustrative computing environment 100 in accordance with one or more example embodiments. The edge device (e.g., including one or more sensors) receives external input 102 in the form of optical detection, pressure, force, electrical stimulus, water detection, humidity detection, sound waves, and/or other tangible, visible inputs. Some examples of sensors include, but are not limited to one or more of: an ultrasonic sensor, a camera, a microphone, a pressure sensor, a passive infrared receiver, and other sensory systems. The one or more sensors may be communicatively coupled to a processor and memory to assist in collecting sensor data 104. In one example, the ultrasonic sensor in the edge device may measure distance and/or detect obstructions in the proximity of the sensor. For example, the ultrasonic sensor may be arranged in a parking lot at a banking center, such as to detect proximity of a customer on the premises.

In another example, one or more optical cameras in the system 100 may capture video and/or still images to identify customers and/or other people/objects. The captured video/images may be used for, inter alia, security authentication purposes or other purposes. The optical sensor may be located in one or more edge devices, or alternatively, the optical sensor may be located apart from the edge device but communicatively coupled to the computing device 101 through module 106. The computing device 101 may receive real-time or non-real-time data from one or more sensors in computing environment 100 or other edge devices. The sensory data feed from module 106 may assist computing device 101 better authenticate a user with matching algorithm 103.

The computing environment 100 may, in some examples, include a plethora of different sensor types to provide information to better authenticate a user at matching algorithm 103. For example, a microphone positioned at an edge device may measure an external input 102 such as sound to capture different sound levels in, inter alia, a banking center or other location. The captured sound may be used to identify customer interactions at the banking center. In another example, a pressure sensor in the system 100 may measure when a force and/or pressure is applied to an object. For example, the measurements from the pressure sensor may be used to determine if a customer is seated or walking away in the event of failure of a camera sensor (e.g., video streaming failure). In yet another example, a passive infrared sensor, or other optical light wave sensor, in the system 100 may detect obstructions in the proximity of the system 100 for, inter alia, security purposes or other purposes. The processing of the sensor data may include analyzing the sensor data to predict, with some degree of confidence, a value for the plurality of attributes in a spectrum data array 302 for the user interaction. The system may assign a value to each field in the spectrum data array 302.

Referring to FIG. 1, in one example, the system 100 may include one or more optical sensors located outside of an automated teller machine (ATM), but positioned in/around an ATM drive-through lane to capture characteristics of the vehicle in which a user arrives at the ATM. The computing device 101 may include a software module 106 that processes the data collected in real-time from one or more edge devices, such as an optical sensor in a video camera and/or optical sensor in a still photo camera located outside of the ATM. The computing device 101 may incorporate this additional real-time data from other edge devices to add security to the transaction. Therefore, additional security may be integrated into the system 100 because the software module 106 may provide attribute values, in addition to the data provided by the spectrum table 105, so that the matching algorithm 103 may appropriately and accurately match the user's attributes/characteristics with those pre-stored in the database 108 of the application server 107. The application server 107 may execute an application 109 that provides centralized user authentication services. However, as explained herein, the numerous advantageous capabilities of the system 100 are not feasible with a solely centralized architecture as embodied in server 107.

Rather, FIG. 1 illustrates an edge server machine in accordance with various features disclosed herein, including a computer processor and a computer memory storing computer-readable instructions that, when executed by the processor, cause the edge server machine to perform numerous steps. For example, the processor may generate a spectrum hash value 303 for the spectrum data array 302 using a hashing algorithm. When the generated hash value matches with a pre-stored hash value 203, then the system 100 may grant authentication to the user by sending an indication 110 of granted user authentication in response to the match step.

For example, the system illustrated in FIG. 1 may be illustrated as an automated teller machine (ATM) that executes the matching algorithm 103 and sends an the indication of granted user authentication occurs even after the ATM has determined that a correct personal identification number (PIN) has been provided for the user. Rather, the system 100 may determine whether to grant authentication to the user in a continuous manner. In other words, even after initial authentication is complete, as additional requests are made, if the requests are such that a higher level of security might be desired (e.g., a withdrawal of money), then additional authentication may be seamlessly (or not seamlessly) performed in the background using one or more edge devices. In other examples, the additional authentication may be automatically, preemptively performed, but used only when desired. For example, if a user performs or requests to perform an action that might be outside of the user's typical pattern of behavior, the system may enforce additional authentication. The additional authentication may be performed overtly such that the user is made aware that additional authentication is desired, or covertly such that the user is not interrupted with an indication that additional authentication is desired. Alternatively, the system may perform authentication services on an automatic, recurring basis during a user transaction.

Figure 5:
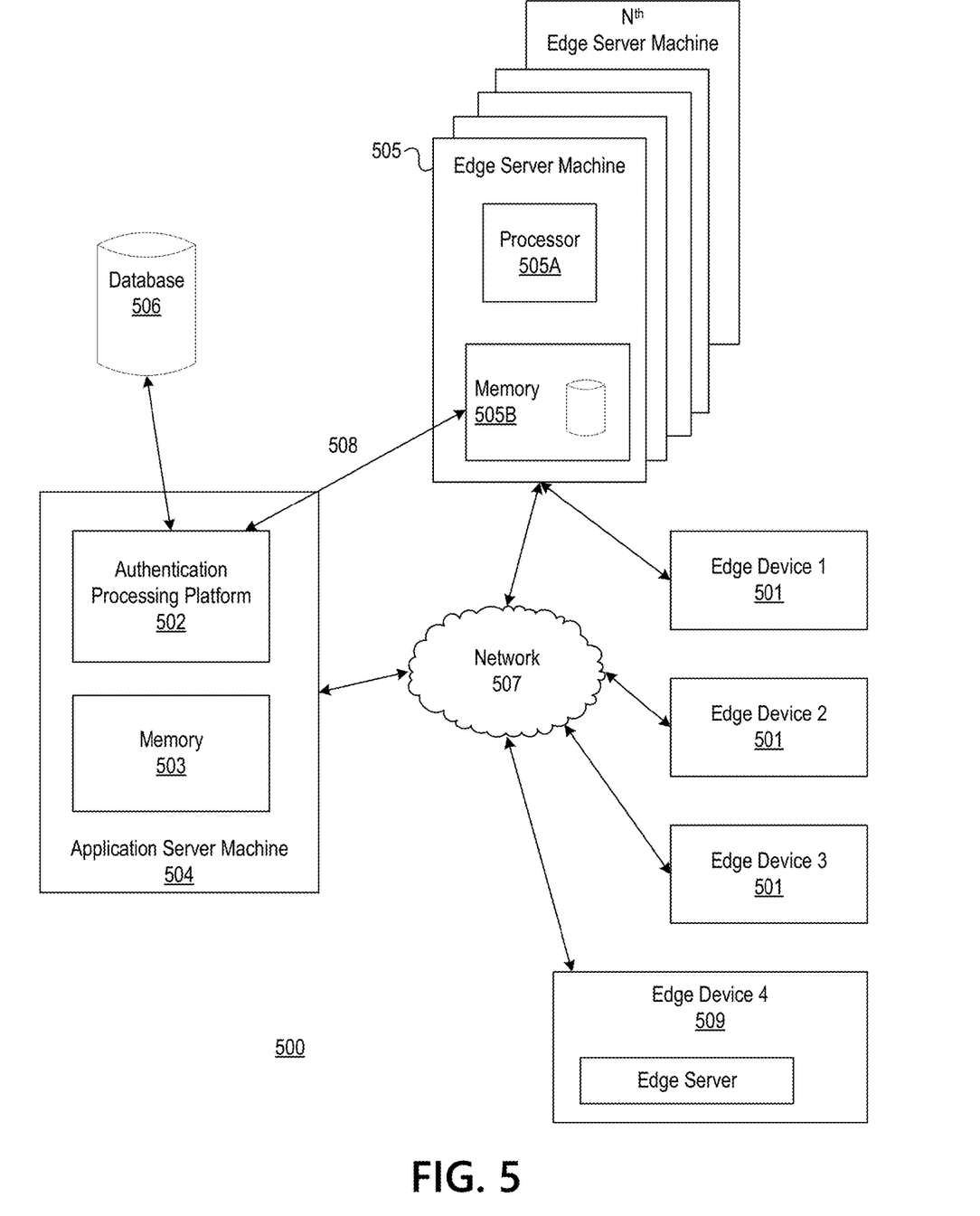
FIG. 5 depicts illustrative computing environments in accordance with one or more example embodiments.
Figure 6:
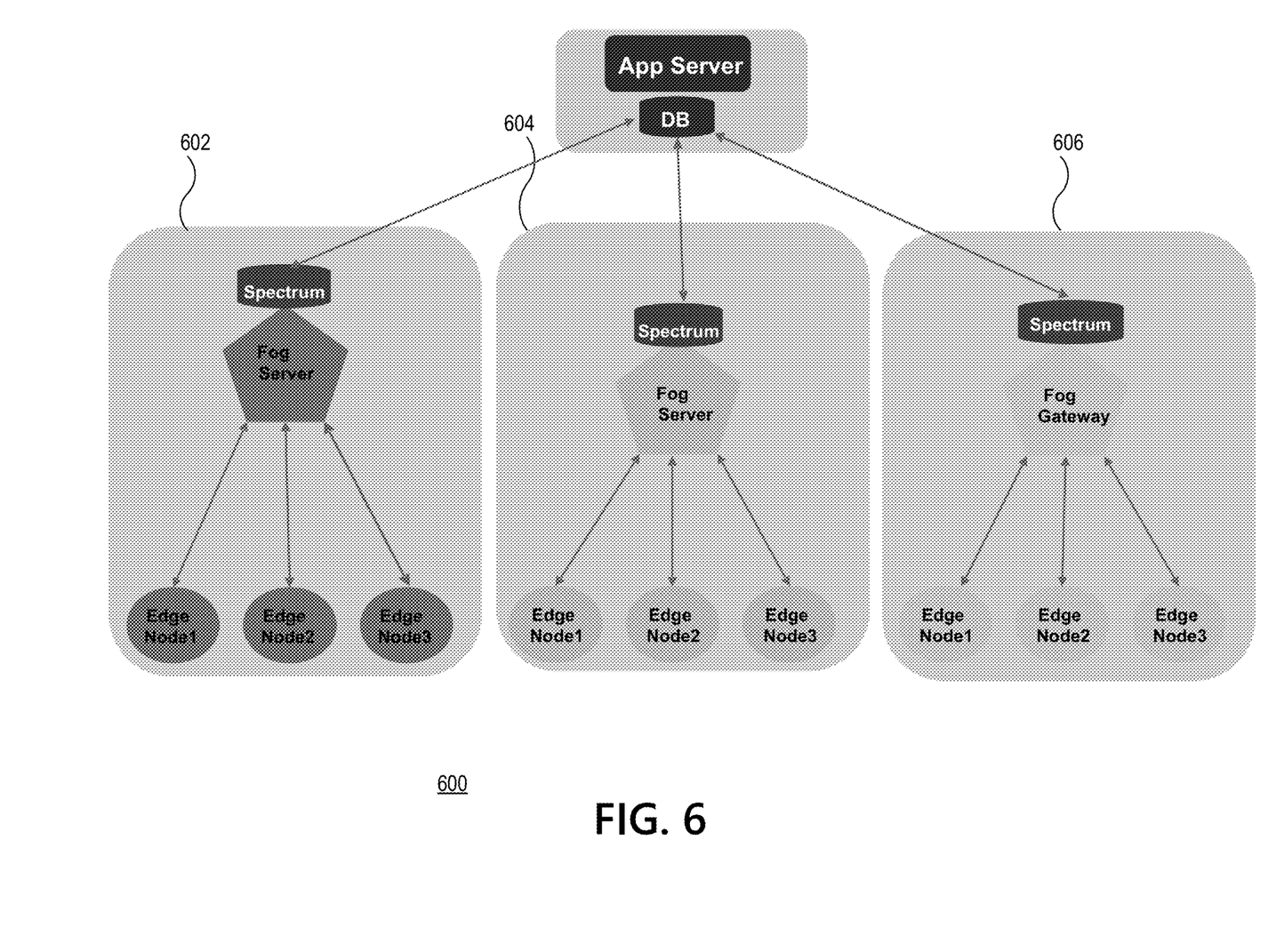
FIG. 6 depicts illustrative computing environments in accordance with one or more example embodiments.

Referring to FIG. 2, FIG. 3A, and FIG. 3B, as explained with reference to FIG. 1, a data table 200 stored in memory may include a pre-stored hash value 203 for a user. The data table 200 may be large, thus it may be stored at an application server machine central to numerous edge devices. However, as explained herein, to address technological limitations of a high-volume storage device, a plurality of fog servers may be located in the edge computing environment 101 to process in near real-time, or at least with faster response time than prior art authentication systems. As a result, the system as illustrated in FIG. 1, FIG. 5, and FIG. 6 may operate with one or more technological advantages outlined in this disclosure.

Figure 4:
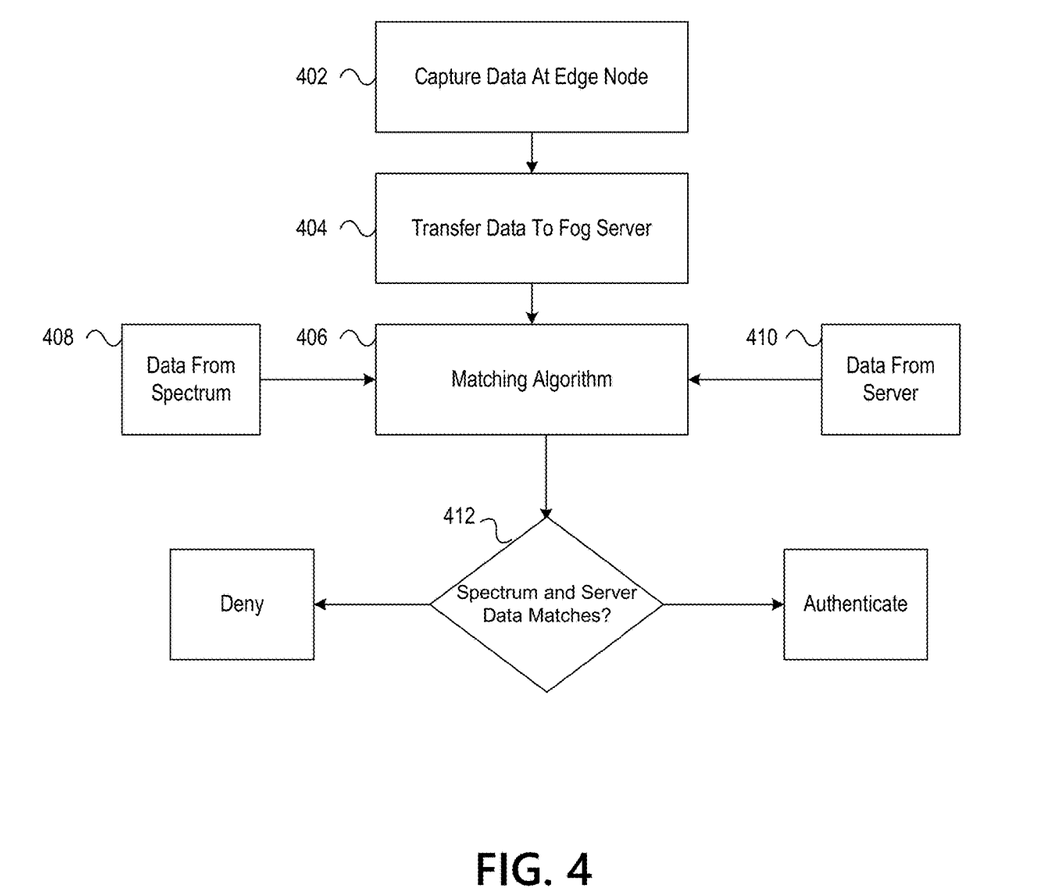
FIG. 4 is a flowchart in accordance with one or more example embodiments.

Referring to FIG. 4, a flowchart is disclosed in accordance with one or more example embodiments. In one example, FIG. 4 illustrates a flowchart for a method comprising steps including but not limited to the steps listed below. An edge server machine 505 for authenticating a user is disclosed. Specifically, a secure Internet of Things (IoT) and/or mobile-based authentication system in an edge computing model is disclosed that integrates a data spectrum table 301 and spectrum hash values 303 to improve performance, efficiency, and/or security.

In step 402, edge nodes 501, 509 extract key features from user authentication data. During authentication, the edge nodes may capture and then transfer data about the characteristics of the user interaction to a fog server 505. In one example, the system uses a spectrum of attributes/values/inputs from sensors of edge devices 501 in lieu of, or in addition to, just a single, password/PIN/value for authentication. Moreover, unlike some prior user authentication systems which have a one-time password/login, the disclosed system may perform continuous/subsequent authentication using attributes/values/inputs collected by one or more edge devices 501 during post-login activities/interactions to re-authenticate/maintain the authentication.

In step 404, the derived data is transferred to fog servers. A non-exhaustive list of examples of derived data include the attributes in illustrative data spectrum table 301 in FIG. 3A. In turn, the fog server 505 maintains, in step 408, a spectrum of data at memory 505B associated with the fog server. In other words, the fog server represents data as a spectrum with possible range of values. Moreover, in some examples, the system 500 may use a hash table that enables distributed, edge authentication functionality that conventionally required a central server at-scale. Such a hash table may be used to reduce the data store size such that one or more edge device(s) on a computer network 507 may meet the data store requirements without being technologically prohibitive. In some examples, to improve security, the data spectrum table 301 and spectrum data array 302 may store reference values/pointers instead of the actual values corresponding to the user. As such, even if a data table 200 is compromised or breached, the values are indecipherable without a data spectrum table 301 mapping the reference values to the actual values. Moreover, the hash value of a data spectrum array 302 provides an additional layer of protection in that any unauthorized access to the hash value provide no useful information without knowledge of the corresponding hashing algorithm.

In some examples, the edge device 309 may analyze the captured data to determine the derived data that is then transferred to a fog server 505. Alternatively, in other examples, the edge device 501 may be a lightweight device with minimal processing capabilities and/or memory storage capacity; and in such examples, the edge device 501 may transmit the captured data to a fog server 505 for analysis and generation of derived data. The derived data may extract key features from the user authentication data such as one or more of the eight attributes, or other attributes, listed in the illustrative table 301 in FIG. 3A.

In step 410, one or more pre-stored hash values 203 (e.g., spectrum references) for users may be stored server side on an application server machine 504. In some examples, the system 500 includes a spectrum table stored at fog/edge server (as illustrated in FIG. 3A), a spectrum data array 302 and spectrum hash value 303 generated and stored in memory 505B at the fog/edge sever 505, and in a large, data table 200 stored at an application server (as illustrated in FIG. 2).

Finally, in step 406, the system 500 uses a matching algorithm to determine if the data from the spectrum server 505 and the data from the edge node 501 match. The system 500 makes a decision based on the outcome of the matching step 406. In some example, the decision includes whether to successfully authenticate or to deny authentication to a user of a computing device. Unlike existing systems, once authentication is either denied or approved, the system does not stop authenticating the user. Rather, the system 500 offers continuous, ongoing, seamless authentication during the user transaction. As a result, if the edge device 501 captures data that suggests that authentication should halt, the system 500 may interject to deny an ongoing transaction of the user. The system 500 is enabled to provide such responsive results with reduced latency/delay due in part to the arrangement of the components in system 500 at the edge of the network 507, instead of in a central-server type architecture that is heavily over-reliant on an application server machine 504 and its database 506.

FIG. 5 depicts an illustrative computing environment 500 in accordance with one or more example embodiments. In one illustrative system 500, one or more sensors may be arranged in edge devices 501 in and/or in the proximity of an automated teller machine (ATM). The sensor may comprise a camera configured to capture video of a user at the ATM. The sensor data may be used for purposes of enhancing security at the automated teller machine in accordance with one or more aspects disclosed herein. For example, the sensor data generated by an optical sensor may be captured and then analyzed at an edge server machine 505 to reduce the amount of video data that needs to be transmitted to a remote server, such as an application server machine 504. Transmitting a large quantity of video data to a remote server creates undesirable load on the network 507.

Moreover, features such as real-time, continuous security decision-making based on the sensor data at an ATM become technologically feasible when a heavy reliance upon a remote server is ameliorated. For example, the system 500 may include an edge server machine 505 that may identify the face of the user of the ATM and discard all other video data outside of the face. As a result, the amount of video data stored, transferred, and/or analyzed is reduced, thus making the operation of the system more efficient. The video images of the face may be transformed, at the edge server machine 505, into a high-resolution, still image from which attributes of the user may be extracted. The edge server machine 505 then, based on the attributes identified, may adjust the behavior of the ATM in real-time to restrict a user's access if a positive identity cannot be determined.

In some examples, the video data may be obtained from outside of the immediate vicinity of the ATM, such as background video obtained by a different edge device 501 (e.g., edge device 3) and sent to the edge server machine 505 in closer proximity to the ATM than an application server machine 504. As a result, the edge server machine provides real-time processing features to enhance the security of the ATM. Edge server machines 505 may include at least a computer processor 505A and computer memory 505B. In some computing environments, the authentication and computing needs of the system may be great, thus more than one edge sever machine 505 may be available through the network 507 for one or more edge devices 501 to use.

Continuing with the aforementioned example involving a user being authenticated at an ATM, even if the user enters a correct personal identification number (PIN) at the ATM, if the identify of the user cannot be authenticated, then the ATM might take other actions than simply dispensing currency. For example, if a different identity is confirmed in real-time, the ATM may adjust the edge device 501 to record the user's behavior to collect appropriate information to result in the arrest of the user. The system 500 may be communicatively coupled over a network 507 to a database 506 that stores sensor data and other information desired by the system 500. The real-time functionality of the authentication processes is enabled by the unique arrangement of the edge device(s) 501 and edge server machine(s) 505 relative to an application server machine 504 which has a large database 506 storing user authentication information.

In particular, the edge server machine 505 (which may be interchangeably referenced in this disclosure sometimes as a fog server or a spectrum server) receives the raw source data from an edge device 501. In some embodiments where the processor, memory, and power source constraints are alleviated, an edge server may be incorporated into the edge device 509 itself to provide faster response times and reduced latency. In any event, the edge server machine 505 analyzes/extracts the details (e.g., one or more attributes, such as eight attributes enumerated in the first column of FIG. 3A) about the user's visual appearance from the raw source data. The source data might be video data or image data. In another example, the source data might be audio/voice data.

The edge server machine 505 uses a data spectrum table 301 to convert the captured attributes into a spectrum data array 302. The data spectrum table 301 may be stored in computer memory 505B at the edge server machine 505. Consequently, the system 500 is more efficient with respect to the lightweight data. Of course, in other examples, the system may omit the feature of lightweight data, thus the system may be more data-heavy, yet potentially more efficient with respect to responsiveness and computing load.

The data spectrum table 301 may serve as a legend/mapping stored at the edge server machine 505. The range of values collected from the edge nodes 501, 509 may have a corresponding reference value in the data spectrum table 301. As such, the fog server may generate a references for each captured attribute in lieu of storing the actual captured sensor data. For example, instead of storing an image of the user's face that was used by the system 500 to determine the value (such as male, female, or other) for its gender attribute, the edge server machine 505 may simply store a reference value into a spectrum data array. As illustrated in FIG. 3B, a value of "Gen_0" may be stored in a spectrum data array 302 at the appropriate field (i.e., gender field). The spectrum server may have a range of values, so in some examples, only lightweight data need be maintained at the spectrum server. In other words, the spectrum data array 302 comprises reference values instead of the actual attributes. As a result, the spectrum data array and the reference values stored in it add a layer of security protection. Even the data stored in the memory 50B at the edge server machine 505 is just a generic table/mapping, thus there is no real risk of negative consequences if the security of the edge server machine 505 was breached.

In an alternative example, the spectrum data array 302 may store the actual captured attributes. In such an example, the hash value 303 calculated for the array 302 would be based on the actual attribute values and not reference values. In any event, a hash value may be calculated for the array. The hash value may be matched with a large, data table 200, as in several other examples. And, this hash value may occupy a similar quantity of computer memory as in several other examples. However, the additional layer of security protection offered by using reference values in lieu of actual values is omitted.

The edge server machine 505 may include a computer processor 505A, or other comparable logic circuitry, to execute a hashing algorithm that takes the spectrum data array 302 as an input and outputs a hash value 303. This hash value 303 may be used to authenticate the user. If the hash value matches the pre-stored hash value 203 for the user, then the fog server may generate an indication to successfully grant (such as, authenticate) the user to access (or continue to access) the automated teller machine. If the hash values do not match, the fog server may reject the request for access (or continued access) by the user.

In one example, the fog server sends the generated hash value 303 to the application server machine 504. The bandwidth requirements/consumption is noticeably reduced under this approach because the generated hash value maps to the spectrum data array, but does not require all of the values of the captured sensor data to be sent to the application server machine 504 over the network 507. Moreover, in those examples where the data captured by the edge node is transformed using a data spectrum table 301—that is, by reducing the size of the spectrum data array 302 by replacing the actual captured attributes with pre-defined reference values mapped in the data spectrum table—the bandwidth consumption and memory storage requirements are also reduced. The pre-defined reference values may, in some examples, consume less memory than their corresponding actual captured data from the edge node. Some examples of reference values include, but are not limited to Age_0, Age_1, Gen_0, Gen_1, Height_0, App_Ref_0, App_Ref_1, Cmplx_Ref_0, EyeRef_0, Hair_Ref_0, Hair_Ref_1, Class_Ref_0, Class_Ref_1, and others. Other examples of some pre-defined reference values are listed in table 301 in FIG. 3A.

In other words, the use of a hash value provides a technological benefit in a cloud environment with multiple edge devices 501, 509 collecting data where the network bandwidth consumption can become prohibitive to real-time, responsive operation. For example, for a feature like continuous authentication at an ATM, network bandwidth considerations can be a bottleneck. Even after initial authentication is complete, as additional requests are made, if the requests are such that a higher level of security might be desired (e.g., a withdrawal of money), then additional authentication may be performed by the system 500 in the background using one or more edge devices 501, 509. In other examples, the additional authentication may be automatically, preemptively performed, but used only when desired. For example, if a user performs or requests to perform an action that might be outside of the user's typical pattern of behavior, the system may enforce additional authentication. The additional authentication may be performed overtly such that the user is made aware that additional authentication is desired, or covertly such that the user is not interrupted with an indication that additional authentication is desired.

In some examples, the generated spectrum hash value 303 may be sent 508 to the application server machine 504 to execute a look-up against a pre-stored hash table being maintained there. One example of a pre-stored hash table might look like table 200 in FIG. 2 and may be stored in an enterprise database 506 due to a potentially massive size of the table 200. In some examples, the application server machine 504 may store in memory 503 a table that looks similar to table 200 with the first column and final column of table 200 included and the other columns displayed in FIG. 2 omitted. Such a two-column table may suffice as a minimum look-up table for the spectrum hash value 303 to determine if it corresponds to the authorized user (e.g., student with a particular StudentId). An authentication processing platform 502 of the application server machine 504 may receive as an input the spectrum hash value 303 from the edge server machine 505, and execute a matching algorithm to determine if the spectrum hash value 303 sufficiently matches the pre-stored hash value 203, which may be stored in memory 503, for the user authenticated to the ATM. The authentication processing platform 502 may return a simple Boolean true or false (or comparable 0 or 1, or other binary output) to the edge server machine 505 to indicate whether the user was successfully authenticated or not. If the hash value matches the pre-stored hash value 203 for the user, then the fog server may generate an indication to successfully grant (such as, authenticate) the user to access (or continue to access) the automated teller machine. If the hash values do not match, the fog server may reject the request for access (or continued access) by the user.

In one embodiment, the authentication system may be further decentralized by having the edge server machine 505 perform the actual look-up operation using a replicated database stored in memory 505B at the edge server machine 505. The replicated database may be a redacted version of table 200 in FIG. 2 stored in database 506 with the first column and final column included, but with the other columns displayed in FIG. 2 omitted. Such a redacted two-column table may suffice to reduce memory storage requirements at the edge server machine 505, while still providing user authentication functionality. Moreover, in some examples, the size of the replicated database may be reduced by optimizing for those hash values that have a higher probability of being used at a specific edge server machine. For example, the data spectrum table 301 at a specific edge server machine 505 may identify a particular range of values for captured attributes by the edge device(s) 501. And as such, the application server may limit the specific replicated database for that particular edge server machine to those hash values that fall within the range.

As illustrated in FIG. 5, a secure connection 508 from the application server machine 504 to the memory storage 505B of each edge server machine 505 may be used to transfer sensitive data. For example, replicating of and transfer of a spectrum hash look-up table or a redacted version of it may be considered a sensitive transfer of data. Since the spectrum hash look-up table omits the actual confidential data about the user, it may be transmitted to the edge server machine 505 without apprehension of a security data breach. In some examples, the data may be transmitted over network 507 from the application server machine 504 to the memory 505B in the edge server machine 505 without use of a separate, private, dedicated, direct connection 508.

Although FIG. 5 is sometimes explained with reference to an example involving a user desiring authentication with an ATM, the system 500 of FIG. 5 is not so limited. For example, in another example, a user may be a student desiring access to a door/entrance into a building. The student may approach the front office by walking up a set of stairs to a door electronically actuated by an electronic key fob device. The stairs may be monitored by an edge device 501 comprising a camera. An edge server machine 505 communicatively coupled to the edge device 501 may capture the raw sensor data and execute one or more data processing modules on the sensor data to identify values for one or more attributes that can be stored in a spectrum data array 302. In some example, the attribute values may be transformed into a reference value mapped by a data spectrum table 301. The system 500 may operate similar to as explained in the example involving an ATM by adding an additional level of security to the entrance door—in addition to just a key fob, if the user is entering at an anomalous time or under other circumstances, the edge server machine 505 may interject to deny access to the entrance if the captured user attributes do not match those corresponding to a pre-stored hash value 203. For example, if someone has taken (e.g., stolen) the student's key fob and is attempting to use it in a breach of security, the edge server machine 505 may cause an edge device comprising the electronic lock actuator to change its behavior/operation accordingly. Other technologically integrated use-cases will be apparent to a person of skill in the art after review of the entirety disclosed herein.

Figure 7:
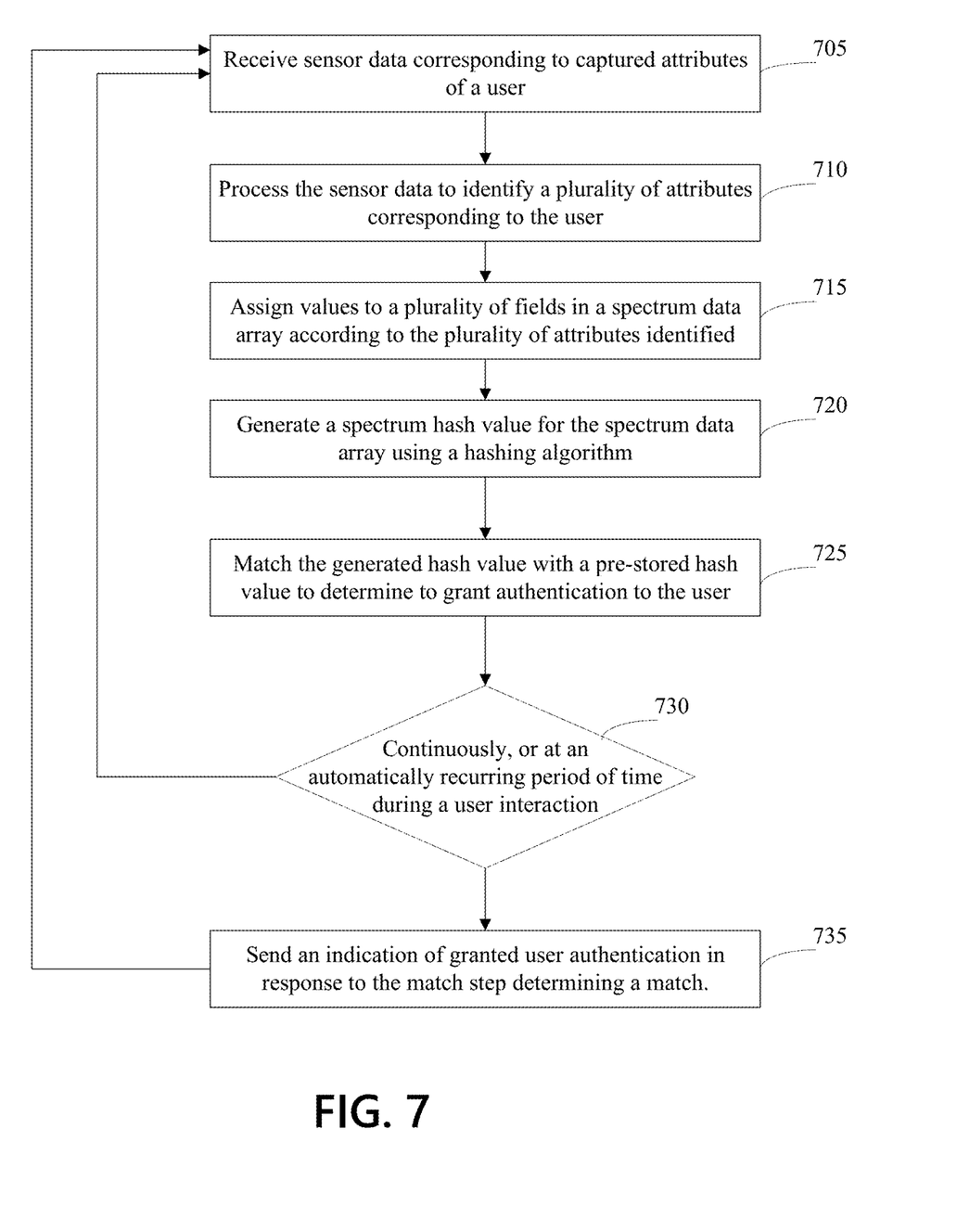
FIG. 7 is another example of flowchart in accordance with one or more example embodiments.

Referring to FIG. 7, a flowchart is disclosed of yet another example in accordance with one or more example embodiments. One general aspect includes a method for an automated teller machine (ATM) to seamlessly and repeatedly authenticate a user. The method may include receiving 705 sensor data, by an edge server machine, from the one or more sensors of one or more edge devices. The sensor data may correspond to captured attributes of a user of an ATM that dispenses currency, such as US dollar bills or other currency, to the user.

Although FIG. 7 is described in relation to an ATM, the disclosure is not so limited. FIG. 6 illustrates various computing environments 600 in accordance with one or more example embodiments. In FIG. 6, a plurality of fog server environments 602, 604, 606 may communicate with their respective edge nodes (e.g., nodes 1-3) and maintain a data spectrum table in a data store coupled to the fog server. The data store may periodically, or in real-time, communicate with a centralized database communicatively coupled to an application server machine, such that the data across the fog server environments 602, 604, 606 may remain synchronized and consistent. As such, a user may visit one ATM in a region, and then visit a different ATM in another region with consistent and repeatable results—that is, the fog servers over different ATMs may all correctly authenticate the user using captured attributes.

The captured sensor data of the user may include, but are not limited to: visual characteristics of the user, and biometric characteristics of the user. The one or more sensors of the one or more edge devices may include: an optical sensor, a microphone, a biometric scanner, and other types of sensors. The computer processor of the fog server 602 may process, in step 710, the sensor data to identify a plurality of attributes corresponding to the user.

In step 715, the processor of the fog server 602 may assign values to a plurality of fields in a spectrum data array 302 according to the plurality of attributes identified. In some examples, assigning the values to the plurality of fields in the spectrum data array 302 may include using a data spectrum table 301 to identify a reference value corresponding to each of the plurality of attributes identified. And then, assigning the reference value to the spectrum data array 302 instead of the value derived from the processed sensor data. As a result, an additional layer of security may be integrated into the system 600.

In step 720, the processor of the fog server 602 may generate a spectrum hash value 303 for storing in the spectrum data array 302 using a hashing algorithm. The fog server 602 may include a computer memory that stores a data spectrum table 301. Meanwhile, an application server machine central to a plurality of fog servers 602, 604, 606 may maintain pre-stored hash values 203. In step 725, the fog server 602 may retrieve the generated hash value 303 with the pre-stored hash value 203 to determine if they match. If they match, determine to grant authentication to the user. However, if they do not, the system 600 may discontinue the user's ability to transact with the ATM or other computing device secured with the system 600.

In some embodiments, the determination to grant authentication to the user occurs 730 one of nearly continuously, repeatedly, or at an automatically recurring period of time during a user's interaction with the computing device or ATM. The system 600 may adjust the frequency of authentication occurrences 730 based on one or more criteria, such as the risk profile of the type of transaction the user is requesting, the time of day, and/or other circumstances leading up to the transaction.

In response to a determination of a match, the system 602 may send, in step 735, an indication of granted user authentication. In some examples, indication of granted user authentication may be sent repeatedly, even after the ATM has received a correct personal identification number (PIN) for the user. The system's ability to perform repeatedly, frequently, and/or in potentially near real-time, is due in part to the configuration of the components in system 600 in an edge architecture with lightweight hash tables and spectrum data arrays. In some examples, the amount of memory occupied by a spectrum hash value 303 is less than the spectrum data array 302, thus conserving memory and bandwidth, and permitting faster response times. Implementations of the described techniques herein may include hardware, a method or process, or computer software on a computer-accessible medium.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

We claim:

1. A computer system for authenticating a user to a computing device, comprising:
   one or more edge devices comprising one or more sensors configured to capture attributes of the user;
   an edge server machine comprising a computer processor and a computer memory storing computer-readable instructions that, when executed by the computer processor, cause the edge server machine to:
   receive sensor data from the one or more sensors of the one or more edge devices;
   process, by the computer processor, the sensor data to identify a plurality of attributes corresponding to the sensor data;
   assign, based on a data spectrum table stored at the edge server machine, reference values to the identified plurality of attributes corresponding to the sensor data to generate a spectrum data array;
generate, based on the reference values assigned to the identified plurality of attributes, a spectrum hash value for the spectrum data array using a hashing algorithm;
when the generated hash value matches with a pre-stored hash value, then grant authentication to the user;
send an indication of granted user authentication in response to determining that values match;
wherein the computer memory of the edge sever machine further stores the data spectrum table; and
an application server machine configured to maintain the pre-stored hash value.

2. The system of claim 1, wherein the computing device comprises an automated teller machine (ATM) that is configured to dispense currency to the user, and the sending the indication of granted user authentication occurs after the ATM has received a correct personal identification number (PIN) for the user.

3. The system of claim 1, wherein the determination that values match occurs one of: continuously, and at an automatically recurring period of time during a user interaction with the computing device.

4. The system of claim 1, wherein the attributes of the user captured by the one or more edge devices comprise visual characteristics of the user.

5. The system of claim 1, wherein the attributes of the user captured by the one or more edge devices comprise biometric characteristics of the user.

6. The system of claim 1, wherein the attributes of the user captured by the one or more edge devices comprise voice characteristics of the user.

7. The system of claim 1, wherein the one or more sensors of the one or more edge devices comprise:
an optical sensor;
a microphone; and
a biometric scanner.

8. The system of claim 1, wherein the processing of the sensor data by the processor comprises analyzing the sensor data to predict a value for the plurality of attributes in the spectrum data array.

9. The system of claim 1, wherein an amount of memory occupied by the spectrum hash value is less than the spectrum data array.

10. The system of claim 1, wherein the one or more sensors are arranged in an automated teller machine that is configured to dispense currency to the user,
wherein the attributes of the user captured by the one or more sensors comprises at least one of: visual characteristics of the user, and biometric characteristics of the user; and
wherein the determination that values match occurs one of: continuously, and at an automatically recurring period of time during a user interaction with the automated teller machine.

11. A method for an automated teller machine (ATM) to seamlessly and repeatedly authenticate a user, the method comprising:
receiving sensor data, by an edge server machine, from the one or more sensors of one or more edge devices, wherein the sensor data corresponds to captured attributes of a user of the ATM configured to dispense currency to the user, wherein the captured attributes of the user comprise at least one of: visual characteristics of the user, and biometric characteristics of the user;
processing, by a computer processor of the edge server machine, the sensor data to identify a plurality of attributes corresponding to the sensor data;
assigning, by the computer processor and based on a data spectrum table stored at the edge server machine, reference values to the identified plurality of attributes corresponding to the sensor data to generate a spectrum data array;
generating, by the computer processor and based on the reference values assigned to the identified plurality of attributes, a spectrum hash value for the spectrum data array using a hashing algorithm;
matching the generated hash value with a pre-stored hash value to determine to grant authentication to the user, wherein the determination to grant authentication to the user occurs one of: continuously, and at an automatically recurring period of time during a user interaction with the ATM; and
sending an indication of granted user authentication in response to determining a match.

12. The method of claim 11, wherein the sending the indication of granted user authentication occurs repeatedly, even after the ATM has received a correct personal identification number (PIN) for the user.

13. The method of claim 11, wherein the edge server machine comprises a computer memory further storing the data spectrum table, and an application server machine maintains the pre-stored hash value.

14. The method of claim 11, wherein the one or more sensors of the one or more edge devices comprise:
an optical sensor;
a microphone; and
a biometric scanner.

15. The method of claim 11,
wherein an amount of memory occupied by the spectrum hash value is less than the spectrum data array.

16. One or more non-transitory computer-readable media storing instructions that, when executed by a computer processor, cause a sensor computing system to:
receive sensor data from a plurality of sensors of one or more edge devices, wherein the plurality of sensors is configured to capture attributes of a user;
process, by the computer processor, the sensor data to identify a plurality of attributes corresponding to the sensor data;
assign, based on a data spectrum table stored at the sensor computing system, reference values to the identified plurality of attributes corresponding to the sensor data to generate the spectrum data array;
generate, based on the reference values assigned to the identified plurality of attributes, a spectrum hash value for the spectrum data array using a hashing algorithm;
when the generated hash value matches with a pre-stored hash value, then grant authentication to the user; and
send an indication of granted user authentication in response to determining that values match.

17. The one or more non-transitory computer-readable media of claim 16, wherein the one or more sensors are arranged in an automated teller machine.

18. The one or more non-transitory computer-readable media of claim 16, wherein an application server machine maintains the pre-stored hash value.

19. The one or more non-transitory computer-readable media of claim 16, wherein the matching occurs one of: continuously, and at an automatically recurring period of time during a user interaction with the sensor computing system; wherein the attributes of the user captured by the one or more edge devices comprise visual characteristics of the user.

20. The system of claim 1, wherein the data spectrum table comprises stored reference values corresponding to ranges of attributes of sensor data.

\* \* \* \* \*